(12) United States Patent
Stuart

(10) Patent No.: US 11,980,254 B2
(45) Date of Patent: May 14, 2024

(54) FOOTWEAR CLEAT

(71) Applicant: Kicks Industries, Inc., Denver, CO (US)

(72) Inventor: Tyler Reece Stuart, Denver, CO (US)

(73) Assignee: KICKS INDUSTRIES, INC., Denver, CO (US)

( * ) Notice: Subject to any disclaimer, the term of this patent is extended or adjusted under 35 U.S.C. 154(b) by 0 days.

(21) Appl. No.: 17/727,434

(22) Filed: Apr. 22, 2022

(65) Prior Publication Data

US 2022/0240627 A1    Aug. 4, 2022

Related U.S. Application Data

(63) Continuation of application No. 16/406,453, filed on May 8, 2019, now Pat. No. 11,330,869.

(60) Provisional application No. 62/668,586, filed on May 8, 2018.

(51) Int. Cl.
| | |
|---|---|
| *A43C 15/16* | (2006.01) |
| *A43C 13/04* | (2006.01) |
| *B29C 45/16* | (2006.01) |
| *B29K 77/00* | (2006.01) |
| *B29L 31/50* | (2006.01) |

(52) U.S. Cl.
CPC ............ *A43C 15/161* (2013.01); *A43C 13/04* (2013.01); *A43C 15/16* (2013.01); *A43C 15/162* (2013.01); *B29C 45/16* (2013.01); *B29K 2077/00* (2013.01); *B29L 2031/50* (2013.01)

(58) Field of Classification Search
CPC ....... A43C 13/04; A43C 15/16; A43C 15/161; A43C 15/162

USPC ........................................ 36/67 R, 67 D, 134
See application file for complete search history.

(56) References Cited

U.S. PATENT DOCUMENTS

| | | | |
|---|---|---|---|
| 255,556 A | 3/1882 | Witham | |
| 2,309,783 A * | 2/1943 | Park ..................... | A43C 15/165 |
| | | | 36/67 D |
| 2,491,596 A | 12/1949 | Zeleski et al. | |
| 3,136,205 A | 6/1964 | Ansingh | |
| 3,328,901 A | 7/1967 | Strickland | |
| 3,552,043 A | 1/1971 | Moffa | |
| 3,942,405 A | 3/1976 | Wagner | |
| 4,330,950 A | 5/1982 | Reddien | |

(Continued)

FOREIGN PATENT DOCUMENTS

| | | |
|---|---|---|
| AU | 5782994 | 5/1995 |
| AU | 677033 | 4/1997 |

(Continued)

OTHER PUBLICATIONS

International Search Report and Written Opinion for International (PCT) Patent Application No. PCT/US2019/031329, dated Jul. 18, 2019, 8 pages.

(Continued)

*Primary Examiner* — Marie D Bays
(74) *Attorney, Agent, or Firm* — Sheridan Ross P.C.

(57) ABSTRACT

The present disclosure relates generally to traction devices for footwear. Cleats are provided that are operable to provide preexisting articles of footwear with enhanced grip, traction and performance. The cleat includes a threaded male extension for interfacing with a preexisting shoe sole and at least one projecting gripping element for contacting or extending toward a ground surface.

20 Claims, 11 Drawing Sheets

(56) References Cited

U.S. PATENT DOCUMENTS

| | | |
|---|---|---|
| 4,360,490 A | 11/1982 | Collins |
| 4,791,692 A | 12/1988 | Collins |
| 5,033,211 A | 7/1991 | Latraverse et al. |
| 5,259,129 A | 11/1993 | Deacon et al. |
| 5,273,383 A | 12/1993 | Hughes |
| 5,318,296 A | 6/1994 | Adams et al. |
| 5,367,793 A | 11/1994 | Deacon et al. |
| D356,613 S | 3/1995 | Adams et al. |
| D371,453 S | 7/1996 | Deacon et al. |
| D371,895 S | 7/1996 | McMullin |
| D371,896 S | 7/1996 | McMullin |
| D372,355 S | 8/1996 | Deacon et al. |
| D373,675 S | 9/1996 | McMullin |
| D378,013 S | 2/1997 | McMullin |
| D380,076 S | 6/1997 | McMullin |
| D385,988 S | 11/1997 | McMullin |
| D387,548 S | 12/1997 | McMullin |
| D389,299 S | 1/1998 | McMullin |
| 5,732,484 A | 3/1998 | Grutza et al. |
| 5,761,833 A | 6/1998 | McMullin et al. |
| 5,794,367 A | 8/1998 | Carroll |
| D401,046 S | 11/1998 | McMullin |
| 5,848,482 A | 12/1998 | Bathum |
| D404,192 S | 1/1999 | McMullin |
| 5,887,371 A | 3/1999 | Curley, Jr. |
| D407,893 S | 4/1999 | McMullin |
| D408,122 S | 4/1999 | McMullin |
| D409,463 S | 5/1999 | McMullin |
| 5,926,980 A | 7/1999 | Adam |
| D415,340 S | 10/1999 | McMullin |
| 6,023,860 A | 2/2000 | McMullin |
| 6,052,923 A | 4/2000 | McMullin |
| D434,289 S | 11/2000 | McMullin |
| D434,290 S | 11/2000 | McMullin |
| 6,233,850 B1 | 5/2001 | Peabody |
| 6,253,468 B1 | 7/2001 | Hirota |
| 6,305,104 B1 | 10/2001 | McMullin |
| D449,921 S | 11/2001 | McMullin |
| D450,915 S | 11/2001 | McMullin |
| 6,334,748 B1 | 1/2002 | Gudjonsson |
| D466,275 S | 12/2002 | McMullin |
| D469,246 S | 1/2003 | McMullin |
| D493,276 S | 7/2004 | McMullin |
| D495,122 S | 8/2004 | McMullin |
| 6,834,445 B2 | 12/2004 | McMullin |
| 6,834,446 B2 | 12/2004 | McMullin |
| 6,904,707 B2 | 6/2005 | McMullin |
| D510,179 S | 10/2005 | McMullin |
| D513,359 S | 1/2006 | McMullin |
| 6,983,556 B2 | 1/2006 | McMullin |
| D515,294 S | 2/2006 | McMullin |
| D515,295 S | 2/2006 | McMullin |
| D515,296 S | 2/2006 | McMullin |
| D517,292 S | 3/2006 | McMullin |
| 7,007,413 B2 | 3/2006 | McMullin |
| 7,047,674 B1 | 5/2006 | Garvie |
| D522,220 S | 6/2006 | McMullin |
| 7,086,182 B2 | 8/2006 | Deacon et al. |
| D553,336 S | 10/2007 | McMullin |
| 7,398,610 B2 | 7/2008 | McMullin |
| D592,391 S | 5/2009 | McMullin |
| 7,597,516 B2 | 10/2009 | Bucciferro et al. |
| 7,647,711 B2 | 1/2010 | McMullin |
| 7,866,064 B2 | 1/2011 | Gerber |
| 8,020,322 B2 | 9/2011 | McMullin |
| 8,382,414 B2 | 2/2013 | Vandenberg |
| 8,601,724 B2 | 12/2013 | Shiue et al. |
| 11,330,869 B2 * | 5/2022 | Stuart .................... B29C 45/16 |
| 2001/0011429 A1 | 8/2001 | Peabody |
| 2002/0069559 A1 | 6/2002 | Gee |
| 2003/0131502 A1 | 7/2003 | Terashima |
| 2003/0188459 A1 | 10/2003 | Kelly et al. |
| 2005/0198868 A1 | 9/2005 | Scholz |
| 2005/0269878 A1 | 12/2005 | Lefgren |
| 2006/0277800 A1 * | 12/2006 | Santos ................ A43C 15/168 36/134 |
| 2007/0209239 A1 | 9/2007 | Kelly |
| 2009/0084560 A1 * | 4/2009 | Spooner ............... A43C 15/161 36/62 |
| 2009/0223088 A1 | 9/2009 | Krikorian et al. |
| 2009/0229147 A1 | 9/2009 | McMullin |
| 2009/0229988 A1 | 9/2009 | McMullin |
| 2010/0186262 A1 | 7/2010 | Krikorian et al. |
| 2010/0229427 A1 * | 9/2010 | Campbell ............ A43C 15/168 36/62 |
| 2011/0088287 A1 * | 4/2011 | Auger .................. A43B 13/223 36/114 |
| 2013/0305567 A1 * | 11/2013 | Johnson ................ A43C 15/02 36/103 |
| 2014/0259764 A1 | 9/2014 | Schoenleber |
| 2016/0115989 A1 | 4/2016 | Hubmann |
| 2016/0309846 A1 * | 10/2016 | Fisher ................. A43C 15/161 |

FOREIGN PATENT DOCUMENTS

| | | |
|---|---|---|
| AU | 709983 | 4/1997 |
| AU | 91408/98 | 5/1999 |
| CA | 2493568 | 1/2004 |
| CA | 2495994 | 3/2004 |
| CA | 2498400 | 3/2005 |
| EP | 1420661 | 5/2004 |
| EP | 1505889 | 2/2005 |
| EP | 1653821 | 5/2006 |
| GB | 2298563 | 9/1996 |
| GB | 9621064 | 4/1997 |
| WO | WO 03/013303 | 2/2003 |
| WO | WO 2009/039271 | 3/2009 |
| WO | WO 2009/114789 | 9/2009 |

OTHER PUBLICATIONS

International Preliminary Report on Patentability for International (PCT) Application No. PCT/US2019/031329, dated Nov. 19, 2020, 8 pages.
Official Action for U.S. Appl. No. 16/406,453, dated Jan. 29, 2021, 8 pages.
Official Action for U.S. Appl. No. 16/406,453, dated May 17, 2021, 8 pages.
Official Action for U.S. Appl. No. 16/406,453, dated Oct. 26, 2021, 8 pages.
Notice of Allowance for U.S. Appl. No. 16/406,453, dated Jan. 20, 2022, 5 pages.

* cited by examiner

FOOTWEAR CLEAT

REFERENCE TO RELATED APPLICATIONS

This U.S. Non-Provisional Patent Application is a Continuation of and claims the benefit of priority from U.S. Non-Provisional patent application Ser. No. 16/406,453, filed May 8, 2019, and U.S. Provisional Patent Application Ser. No. 62/668,586, filed May 8, 2018, the entire disclosures of which are hereby incorporated by reference.

FIELD

The present disclosure relates generally to methods, systems and devices for footwear. More specifically, various embodiments of the present disclosure relate to a threaded insert for selective connection to or insertion within preexisting footwear. Certain embodiments provide gripping elements that are operable to be inserted into and/or combined with preexisting footwear and increase the traction, grip, or performance thereof.

BACKGROUND

It is known to provide extensions or cleats with articles of footwear. Some articles of footwear are known to comprise spikes or extensions that are formed with or permanently connected to a bottom portion of the article, such as those commonly used with certain athletic shoes. Other known shoes provide female recesses in a lower portion thereof, and the female recesses are operable to selectively receive a spike or cleat with a male threaded portion. One such device is shown and described in U.S. Pat. No. 8,020,322 to McMullin, which is hereby incorporated by reference in its entirety.

Various known devices that comprises a system having a shoe sole with a pre-formed female portion or threaded receptacle are relatively difficult and expensive to manufacture. Additionally, these devices are also difficult and expensive to manufacture. Additionally, the cleats or spikes that are provided with such systems are useless without the corresponding shoe and appropriately sized pre-formed receptacle.

SUMMARY

Accordingly, there has been a long-felt and unmet need to provide methods, systems and devices of extensions, cleats or gripping elements that can be selectively inserted into a preexisting article of footwear, and wherein the article of footwear is not designed for or otherwise specific to the gripping element(s). As used herein, the terms "cleat" and "gripping element" generally refer to articles that are operable to extend from a lower portion or sole of a shoe to increase traction, friction, grip, and/or performance of a shoe. Although various embodiments of the present disclosure contemplate an extension or gripping element with a plurality of projections, contact points, or traction elements, other embodiments contemplate as few as one projection wherein a single spike or conical member extends from a threaded portion. Accordingly, no limitation with respect to the shape or appearance of devices of the present disclosure is provided herewith. Additionally, no limitation with respect to the intended use or application of methods and devices of the present disclosure is provided. Although certain embodiments of the present disclosure contemplate gripping elements that are well suited for use with golf and provide enhanced traction and grip on turf and golf courses, the present disclosure is not limited to golf or any particular endeavor. Devices of the present disclosure are contemplated for use with golf, hiking, fishing, running, everyday use and any other use or purpose in which increased traction is desired.

In some embodiments, cleats are provided that are relatively easy and cost-effective to manufacture at least as compared with known devices. In certain embodiments, cleats are formed using an injection molding process. In some embodiments, a two-shot mold is provided wherein a first portion of a cleat is formed by injecting a first material. The cleat is fully formed or completed by then injecting a second material. In this manner, a cleat of unitary construction is formed that comprises two different materials with two different material properties. For example, in some embodiments, a first portion is provided that comprise a threaded male extension and a first hardness. A second portion is then formed that comprises a plurality of ground-contacting extensions having a second hardness. In some embodiments, the first hardness is greater than the second hardness.

In various embodiments cleat materials and cleats are provided with one or more colors. The present disclosure contemplates the provision of different cleats that may be useful for different applications, and wherein an intended use or application is indicated by a color. For example, green cleats are contemplated as being provided for use on turf, blue cleats are contemplated as being provided for use on ice, etc.

In some embodiments, a cleat is provided that comprises a first material and a second material. The first material is provided as a base or core member and comprises at least a male threaded member for threadably engaging a shoe (for example). In certain embodiments, the first material comprises a glass-filled nylon. In some embodiments, the glass-filled nylon comprises between approximately 10% and 50% glass. In preferred embodiments, the first material comprises a glass-filled nylon with 22% glass fill. The first material preferably comprises a shear strength suitable to withstand at least about three pound-inches of torque, and more preferably of at least about five pound-inches of torque. In various embodiments, a second material is provided that comprises a hardness that is distinct from the hardness of the first material. In some embodiments, the second material comprises a thermoplastic elastomer ("TPE") with a Shore durometer of between approximately 50 and 150. In some embodiments, the second material comprises a TPE with a Shore durometer of about 90.

In certain embodiments of the present disclosure, a kit for enhancing at least one of traction and performance of an article of footwear is provided. In some embodiments, a kit is provided that comprises a plurality of cleats and at least one installation tool. The cleats comprise a threaded member that is operable for insertion into a shoe sole, and the at least one installation tool comprises a screwdriver for transferring a force to the cleat(s). In some embodiments, the kit further comprises a pilot hole tool, and the pilot hole tool comprises at least one of a pin, a lance, and a fluted bit. In some embodiments, kits comprise packaging (e.g. a box) and information related to recommended installation procedures for the cleats. Such information may include, for example, written directions or information related to a website where media and further information may be found.

In various embodiments, cleats of the present disclosure comprise one or more thermoplastic materials such as polymers and elastomers. In some embodiments, cleats of the present disclosure are devoid of metals. In alternative embodiments, cleats are provided that comprise a metal or ferrous material. For example, in some embodiments, cleats are provided wherein at least one of a threaded male extension, a gripping element and a base portion are provided that comprise a steel. Such embodiments may be useful, for example, for providing traction on ice and rock.

Various embodiments of the present disclosure contemplate a male threaded portion with a hardness and overall geometry that are operable to be threaded directly into a preexisting shoe soles of various different materials and properties. Embodiments of the present disclosure contemplate that a user may apply cleats of the present disclosure by simply applying a normal force and a torque to the cleat to threadably insert the cleat into the sole of the shoe and penetrate the shoe sole material. In some embodiments, it is contemplated that a screwdriver or similar tool is operable to apply or transfer a force to the cleat to secure the cleat to a shoe. In further embodiments, it is contemplated that a pilot hole is needed or preferable. In such embodiments, a pilot hole tool is provided that is provided to form a pilot hole in a shoe sole prior to insertion of a cleat. In various embodiments, pilot holes of the present disclosure are contemplated as comprising at least one of a needle, a punch, and a fluted bit.

In various embodiments, devices of the present disclosure comprise self-tapping devices that are operable to extend into a preexisting article of footwear that is devoid of a preformed female aperture. As used herein, the term "self-tapping" refers to a devices ability to bore or thread into a surface or object. Devices of the present disclosure may, but do not necessarily, create a permanent female aperture in the surface or object to which they are secured. For example, in some embodiments, it is contemplated that threaded male extensions of the present disclosure can self-tap a shoe sole that is initially provided without apertures in the sole. This self-tapping does not necessarily comprise or include the formation of a permanent threaded female aperture.

In one embodiment, a cleat is provided that is operable to be selectively secured to a preexisting article of footwear and wherein the preexisting article of footwear is initially devoid of apertures in the sole. The cleat comprises a first portion comprising a first hardness and a second portion comprising a second hardness. The first portion comprises a threaded male extension that is operable to engage a portion of an article of footwear. The second portion comprises a plurality of extensions that are operable to contact a ground surface, and wherein each of the plurality of extensions extend away from the male extension. A shelf portion is provided, and the male extension extends in a first direction away from the shelf portion and the plurality of extensions extend in a second direction away from the shelf portion. In some embodiments, the first hardness is greater than the second hardness.

In another embodiment, a cleat is provided that is operable to be selectively secured to a preexisting article of footwear. The cleat comprises a base member comprising a shelf portion and a threaded male extension extending in a first direction away from the shelf portion, the threaded male extension being operable to engage a portion of an article of footwear. A plurality of extensions is provided that are operable to contact a ground surface, and each of the plurality of extensions extend away from the shelf portion in a second direction. A tool interface is provided that is operable to receive a tool for insertion and interconnection of the cleat to an article of footwear. In some embodiment, the cleat comprises a thermoplastic.

In various embodiments, methods of forming cleats are provided. In one embodiment, a method of forming a cleat for selective interconnection to an article of footwear is provided. The method comprises molding a first portion of the cleat by injecting a first material into a mold, and the first portion comprises a threaded male extension. The first material is allowed to cool. A second portion of the cleat is formed by injecting a second material into the mold, and the second portion comprises a plurality of extensions extending in a direction substantially opposite from the male extension. The second material is allowed to cool, and the cleat is ejected from the mold.

Various embodiments and methods of the present disclosure contemplate the use or provision of an adhesive to secure one or more cleats to a shoe sole. Although various embodiments contemplate that sufficient connection and bonding is achieved by purely mechanical features as shown and described herein, it is contemplated that some embodiment provide or benefit from an adhesive. Devices of the present disclosure are contemplated for use with various different articles of footwear and with soles of various different materials. Applicant has determined that in certain applications, it is desirable to provide an adhesive on at least one of a male threaded portion and a bottom portion of a cleat to enhance a bond or connection between a cleat and an article of footwear.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

Embodiments of the present disclosure have significant benefits across a broad spectrum of endeavors. It is the Applicant's intent that this specification be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Figure 1:
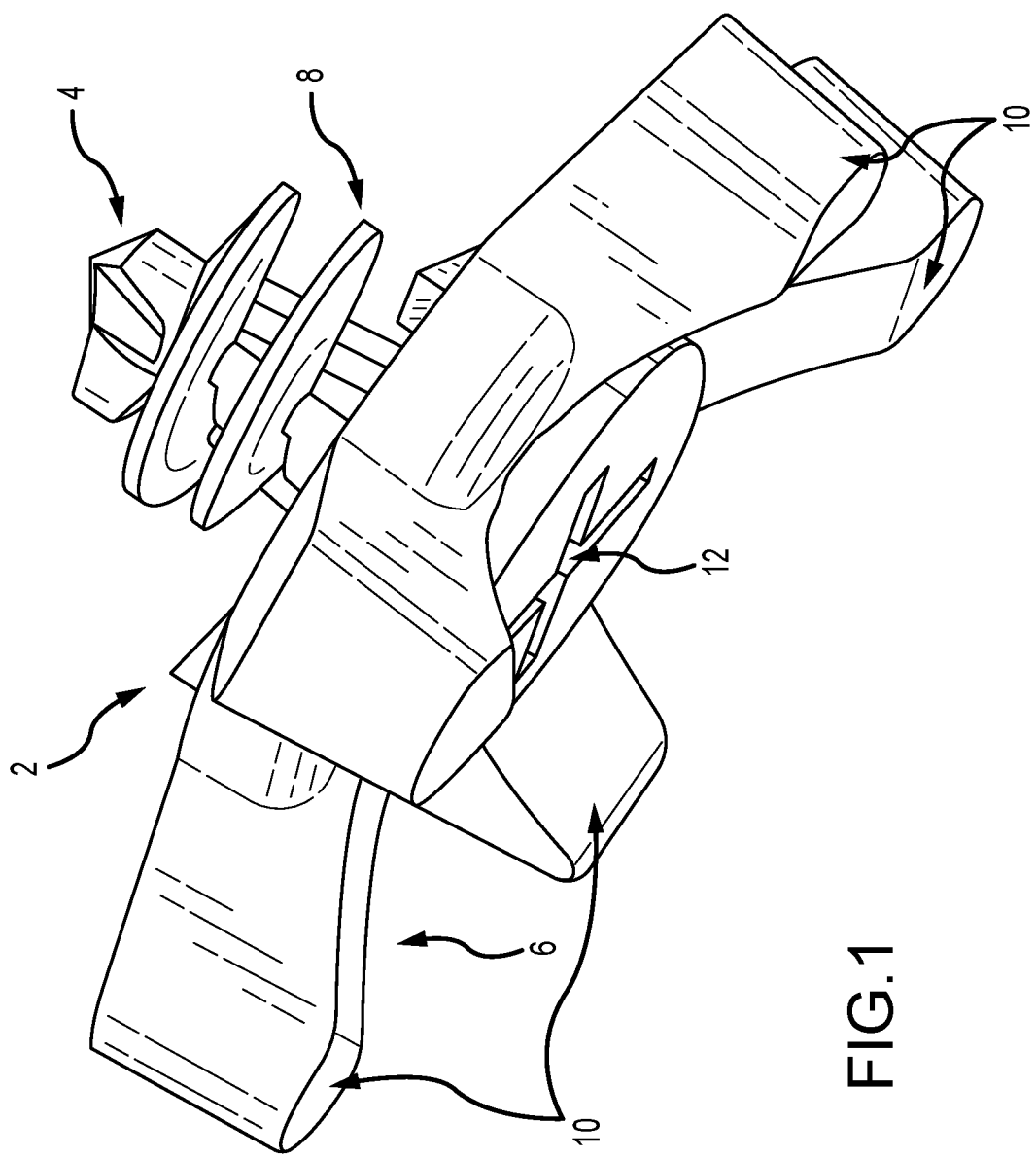
FIG. 1 is a perspective view of a cleat according to one embodiment of the present disclosure.

FIG. 1 is a perspective view of a cleat 2 according to one embodiment of the present disclosure. As shown, the cleat 2 comprises a male extension 4 and an opposing gripping portion 6. In the depicted embodiment, the male extension 4 comprises a threaded member with external threads 8 for selectively inserting at least a portion of the cleat 2 into a shoe sole (for example, and not shown in FIG. 1). The male extension extends above and from a base member. The gripping portion 6 comprises a plurality of extensions 10. In the embodiment of FIG. 1, five extensions 10 are provided. The extensions 10 generally comprise pressure points that are operable to contact or extend into a ground surface and provide enhanced traction for a shoe when the device 2 is secured to a shoe. Although five extensions 10 are shown in FIG. 1, no limitation with respect to the number or shape of extensions 10 is provided. For example, it is contemplated that the cleat 2 comprises only a single extension and/or the extension(s) comprise a pointed tip or spike.

Cleats of the present disclosure are contemplated as being operable to connect, attach, and/or be secured to various different preexisting articles of footwear. For example, cleats 2 of the present disclosure are contemplated as being sold or provided as aftermarket parts or accessories for attachment to preexisting shoes and footwear. The cleat 2 of FIG. 1 comprises a tool interface 12. The tool interface 12 of FIG. 1 comprises a receiving portion for a Phillips head screwdriver. However, other tool interfaces are contemplated. For example, in some embodiments a single slot is provided as the tool interface 12 such that force may be applied to the cleat 2 by a simple object (e.g. a coin or key).

Figure 2:
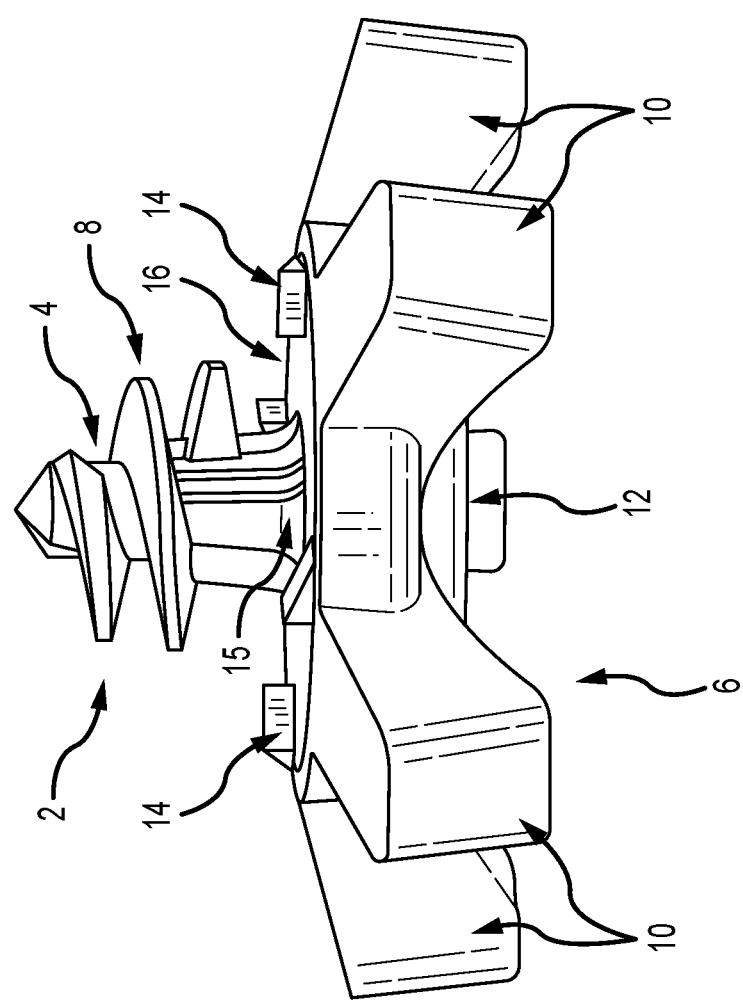
FIG. 2 is an elevation view of a cleat according to one embodiment of the present disclosure.

FIG. 2 is an elevation view of the cleat 2 of the embodiment of FIG. 1. Various features shown and described with respect to FIG. 1 are shown in FIG. 2, and the discussion related to FIG. 1 is incorporated by reference. As shown in FIG. 2, the cleat 2 comprises a shelf portion 16. A plurality of angled projections, ramps or anti-reverse tabs 14 are provided on the shelf. The tabs 14 are operable to extend into and/or contact a shoe sole when the cleat 2 is inserted into the sole and the tabs 14 prevent or reduce a reverse or removal rotation of the cleat 2. The male extension 4 extends from the shelf portion 16. In some embodiments, and as shown in FIG. 2, the male extension 4 comprises a fillet 15 or similar stress-concentrator. The fillet 15 comprises an area of enhanced strength to prevent or reduce the risk that the male extension 4 becomes sheared off from a remainder of the cleat 2.

Figure 3:
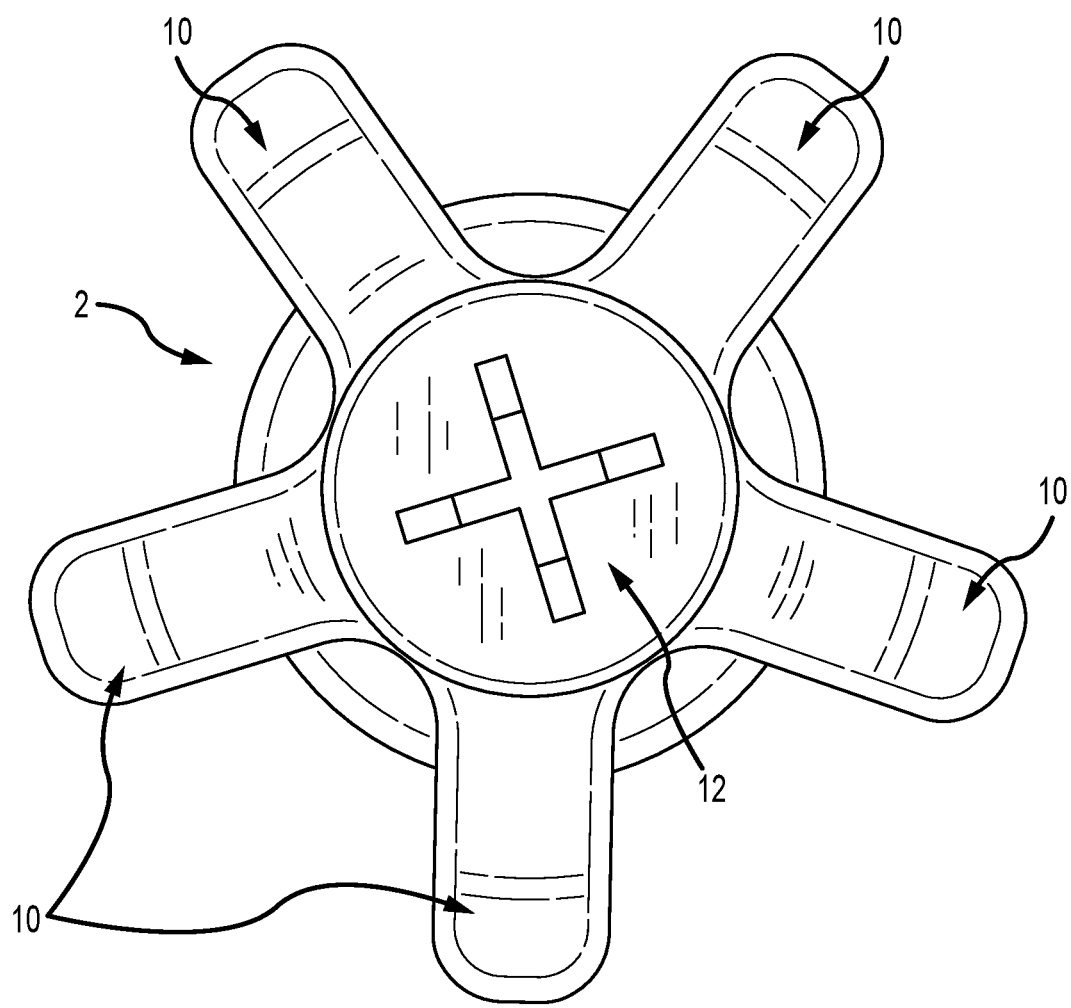
FIG. 3 is a bottom plan view of a cleat according to one embodiment of the present disclosure.

FIG. 3 is a bottom plan view of the cleat 2 according to the embodiment of FIGS. 1-2. As shown, the cleat 2 comprises a plurality of extensions 10 operable to extend toward or into a ground surface. The extensions 10 comprise five evenly and geometrically spaced extensions. A tool receiving interface 12 is provided and is substantially centered in the cleat 2.

Figure 4:
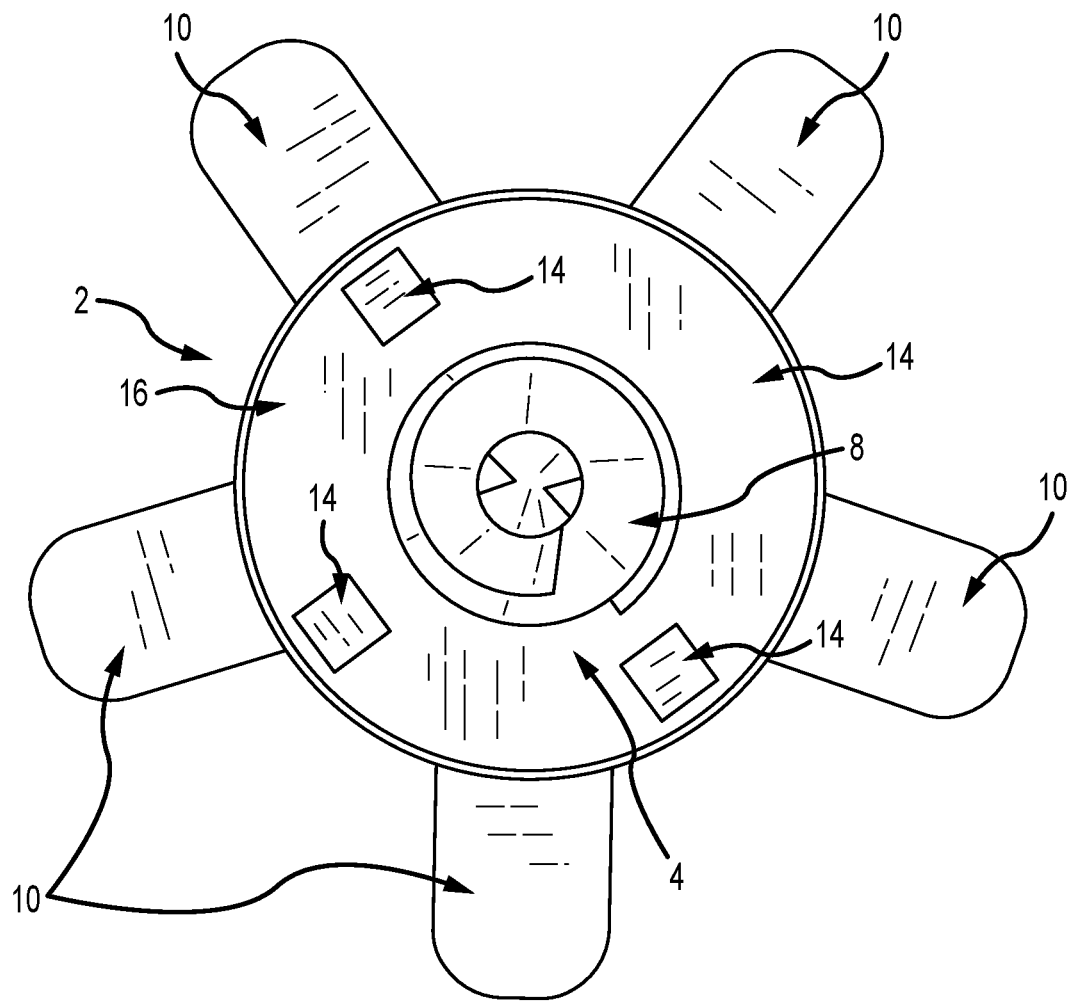
FIG. 4 is a top plan view of a cleat according to one embodiment of the present disclosure.

FIG. 4 is a top plan view of the cleat 2 according to the embodiment of FIGS. 1-3. As shown, a flange or shelf portion 16 is provided. A plurality of anti-rotation tabs 14 extend above the shelf portion 16. Although four anti-rotation tabs 14 are shown, alternative embodiments contemplate and provide one or more tabs 14. In some embodiments, no tabs are provided.

Figure 5:
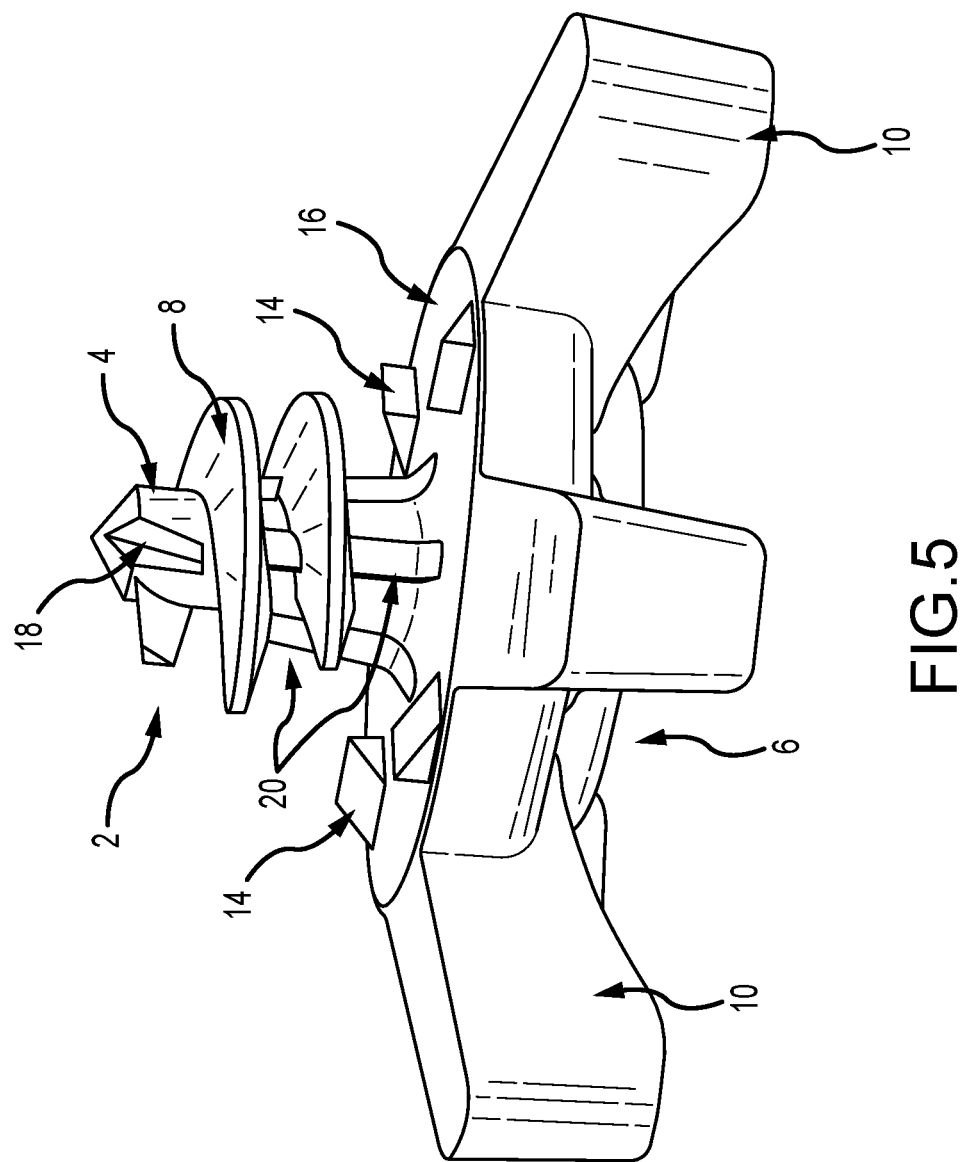
FIG. 5 is a perspective view of a cleat according to one embodiment of the present disclosure.
Figure 6:
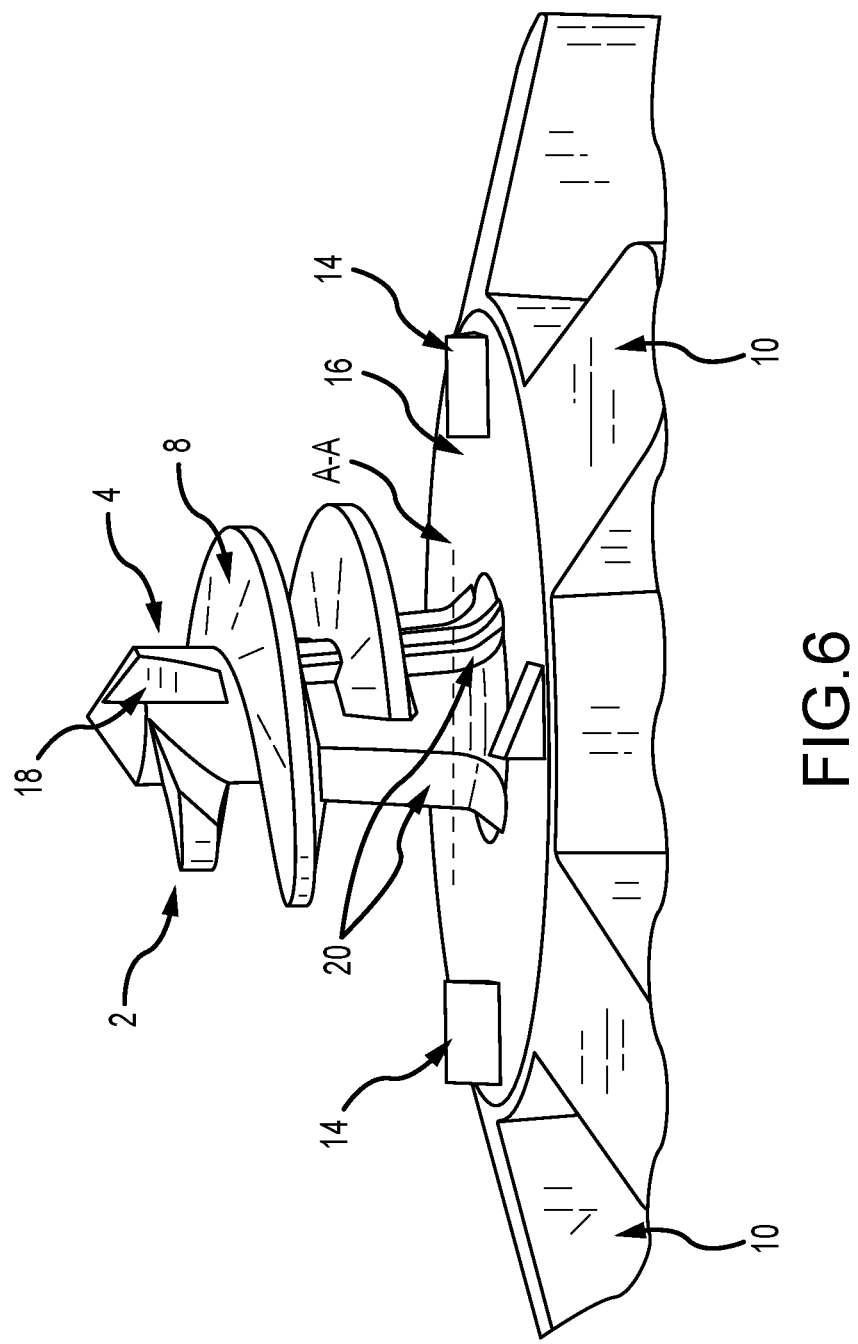
FIG. 6 is a perspective view of a cleat according to one embodiment of the present disclosure.

FIGS. 5-6 are perspective views of the cleat 2 according to the embodiment of FIGS. 1-4. As shown, the male extension 4 comprises an external thread 8. The male extension 4 further comprises a flute 18. The flute 18 is provided to facilitate the insertion of the male extension and initiate a threading or tapping of the male extension 4 into a shoe sole (for example). The male extension 4 further comprises at least one reinforcing rib 20 operable to provide structural support and stability to the male extension 4.

Figure 7:
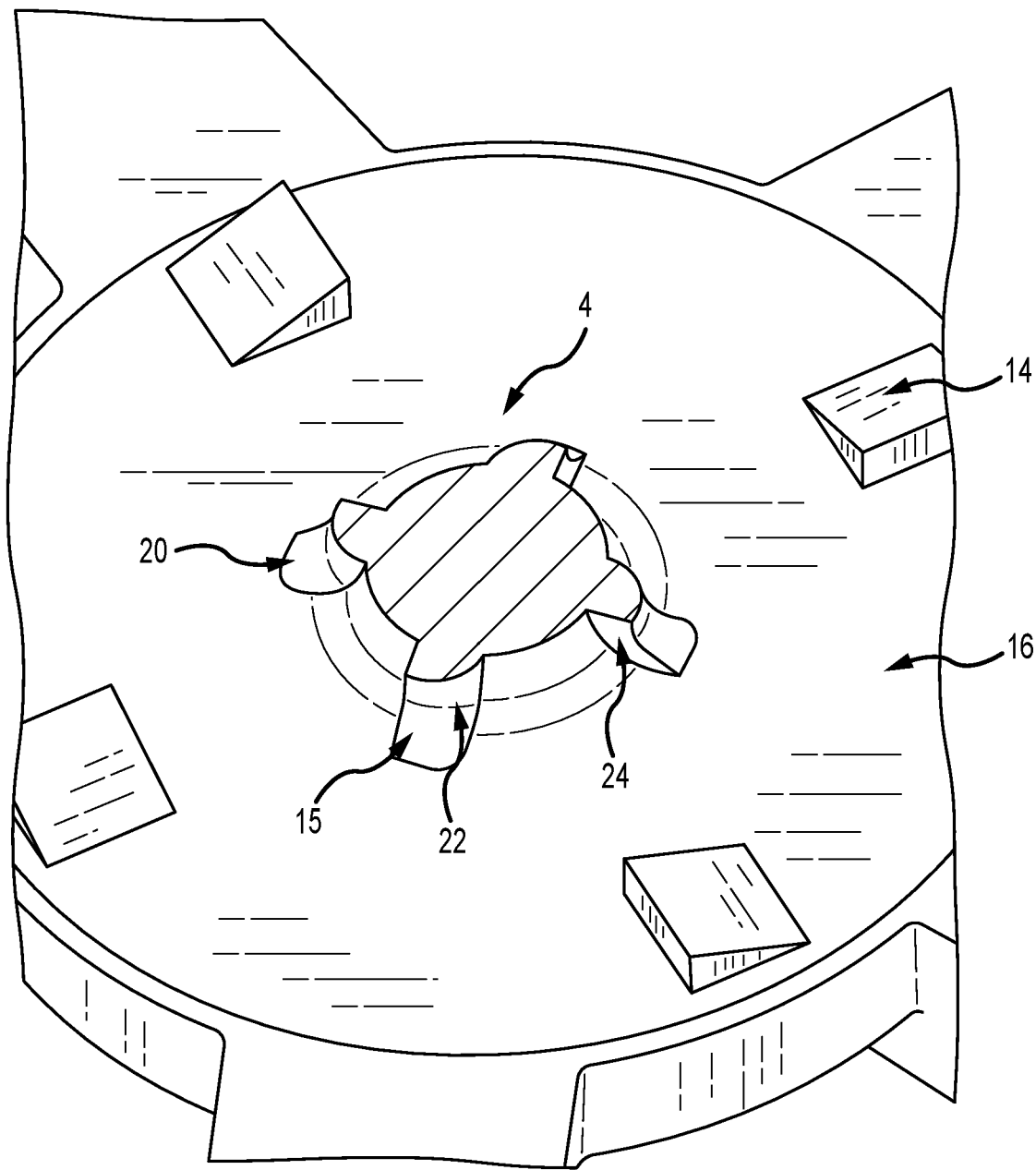
FIG. 7 is a cut-away perspective view of a cleat according to one embodiment of the present disclosure.

FIG. 7 is a cut-away perspective view of the cleat 2 according to the embodiment of FIG. 6. The cut-away is taken at line A-A of FIG. 6 to reveal a cross-sectional shape of the male extension 4. As discussed, the male extension 4 of the depicted embodiment comprises at least one reinforcing rib 20. The reinforcing rib 20 is provided to increase the strength and functionality of the male extension and increases resistance to shear and bending stresses such as those that may be experienced during installation and use of the cleat 2. As shown, a plurality of reinforcing ribs 20 are provided in FIG. 7. The ribs are evenly spaced about a circumference of the male extension 4. The reinforcing ribs 20 of the depicted embodiment comprise a contoured or rounded leading edge 22 and a shelf 24. The leading edge 22 is operable to allow for the cleat 2 and male extension 4 to be threaded into a shoe sole (for example) without significantly impeding rotation. The shelf 24 is provided and comprises a flat surface for contacting a material within which the device is inserted. Accordingly, the reinforcing ribs provide enhanced structural stability to the male extension(s) 4 and further provide resistance to reverse (i.e. removal) rotation of the cleat 2. The reinforcing ribs comprise a fillet 15 or similar expansion member at an intersection or interconnection with the shelf portion 16 of the cleat 2.

In various embodiments of the present disclosure, cleats 2 are provided that are contemplated as being permanent or semi-permanent features after the cleats are installed in a shoe. In alternative embodiments, cleats 2 are contemplated as being selectively insertable and removable. For example, cleats of some embodiments are contemplated as being selectively inserted into an article of footwear for a particular activity (e.g. a round of golf) and selectively removed after the activity has concluded (e.g. to return the footwear to normal use). It is contemplated that various embodiments of the present disclosure are therefore provided without anti-reverse features or locking features. For example, in some embodiments, cleats 2 are provided that are devoid of anti-reverse tabs 14 and do not comprise reinforcing ribs 20 having a shelf 24 for preventing reverse rotation.

Figure 8:
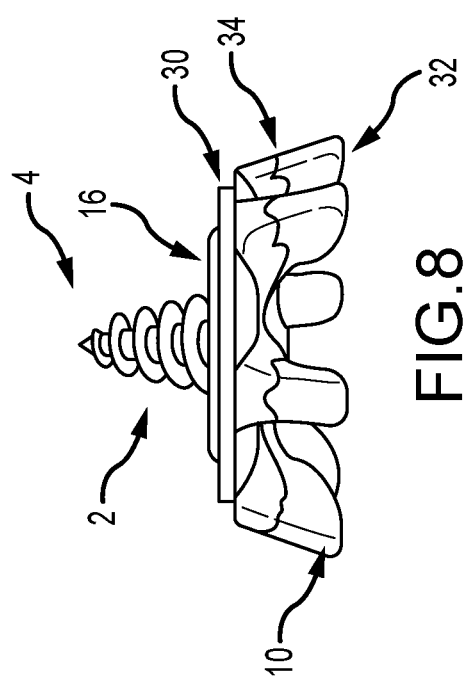
FIG. 8 is an elevation view of a cleat according to one embodiment of the present disclosure.
Figure 9:
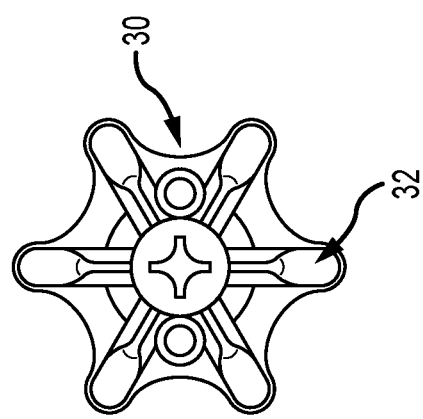
FIG. 9 is a bottom plan view of the cleat according to the embodiment of FIG. 8.

FIG. 8 is an elevation view of a cleat 2 according to one embodiment of the present disclosure. FIG. 9 is a bottom plan view of the cleat 2 of FIG. 8. As shown, the cleat comprises various features already shown and described herein including, for example, a threaded male extension 4 and a plurality of projections 10. The embodiment of FIGS. 9-10 comprises a first portion 30 and a second portion 32. The first portion 30 generally comprises a portion of the device 2 that is intended and operable to be provided in contact with and/or adjacent to an article of footwear. The second portion 32 comprises a portion of the device 2 that is intended to contact and/or be provided proximal to a ground surface. In some embodiments, a first portion 30 is provided comprising a first hardness, and a second portion 32 is provided comprising a second hardness. In some embodiments, the first hardness is greater than the second hardness and wherein the first portion comprises a material and a hardness that is suitable for threadingly engaging a shoe sole and the second portion comprises a material and a hardness that is suitable for contacting a ground surface (turf, for example). The cleat 2 therefore comprises a plurality of materials. In some embodiments, cleats comprising multiple materials are formed using a two-shot molding process. Preferably, the material used for the first portion 30 and the material used for the second portion 32 are complementary materials that are operable to form a molecular bond. An interface 34 is provided between the first portion 30 and the second portion 32. In the embodiment of FIG. 8, the interface 34 comprises a contoured interface with greater surface area than a straight-line interface (e.g. a butt joint). The contoured interface 34 comprise a greater bonding strength between the first portion 30 and the second portion 32.

In various embodiments, methods of forming a cleat 2 are provided. In some embodiments, the method comprising injecting a first material into mold to shape a first portion 30. A second, softer material is thereafter injected in a two-shot molding operation. In preferred embodiments, a tool interface is formed in the second material during the molding process.

Figure 10:
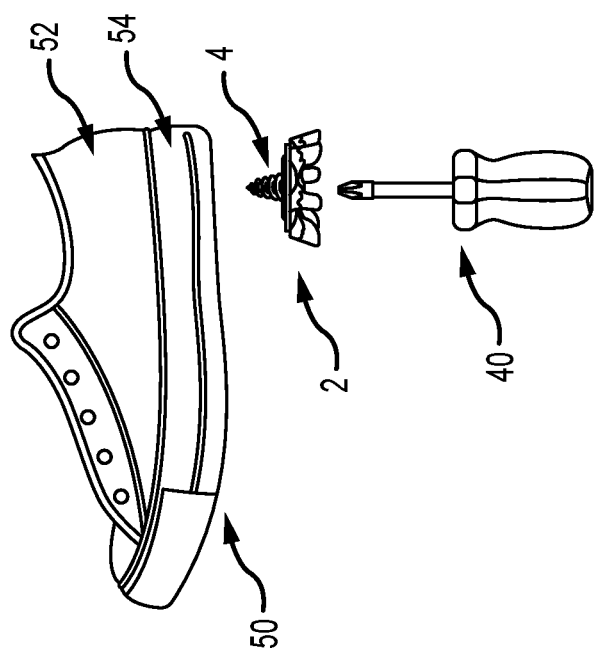
FIG. 10 is an elevation view of a cleat and related features according to one embodiment of the present disclosure.

FIG. 10 is an elevation view of a cleat 2 and associated installation tool 40 in accordance with an embodiment of the present disclosure. In various embodiments of the present disclosure, kits are provided that comprise a plurality of cleats 2 and a tool 40 for installing the cleat(s). A preexisting article of footwear 50 is shown in FIG. 10. The article 50 comprises a known shoe having a soft or flexible upper 52 and a sole 54. The sole is contemplated as comprising rubber, but devices of the present disclosure are not limited to shoes having a sole of any particular material. In various embodiments, it is contemplated that one or more cleats 2 as shown and described herein are selectively inserted into an article of footwear 50 by simply applying at least one of a normal force and a torque to the cleat 2 via an installation tool 40. The cleat 2 preferably comprises a male threaded portion 4 of a predetermined height extending above a shelf portion 16. The shelf portion 16 provides various benefits including a support structure and platform for the extensions 10. The shelf portion 16 also comprises a physical stop wherein the shelf portion 16 and the male extension 4 are sized such that the shelf portion contacts the shoe sole 54 and prevents the male extension 4 from extending through the sole 54 and into an interior volume of the shoe 50.

Figure 11A:
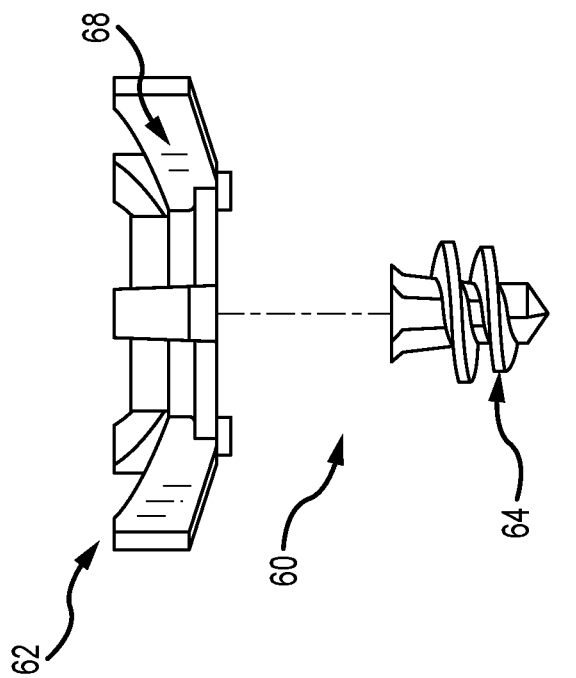
FIG. 11A is a top plan view of a cleat according to one embodiment of the present disclosure.
Figure 11B:
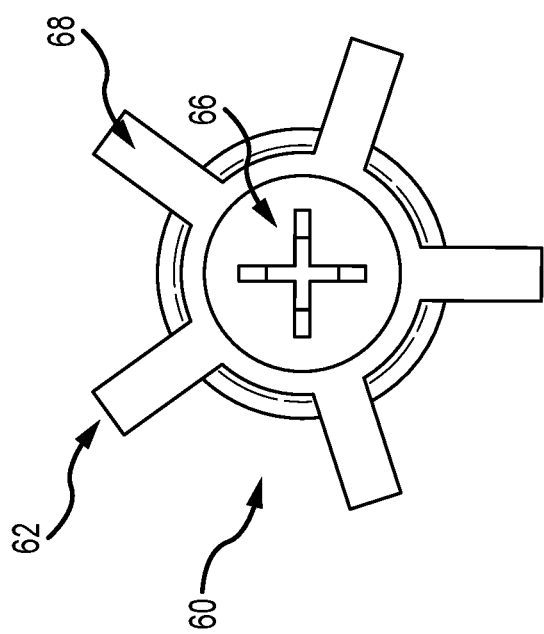
FIG. 11B is an elevation view of the cleat according to the embodiment of FIG. 11A.
Figure 11C:
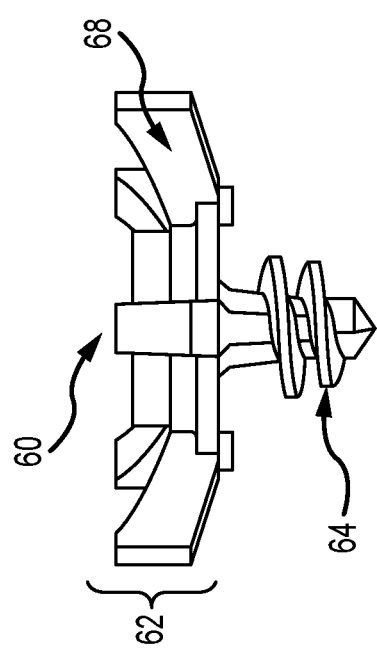
FIG. 11C is an exploded elevation view of the cleat according to the embodiment of FIG. 11A.

FIGS. 11A-11C depict a cleat 60 according to another embodiment of the present disclosure. As shown, the cleat 60 comprises a self-tapping cleat for attachment to articles of footwear. The cleat 60 comprises a gripping portion 62 with a plurality of extensions 68. A tool interface 66 is provided on a lower portion of the cleat 60 that is operable to assist with inserting and threading the cleat into footwear. A male extension 64 is provided that extends from the cleat 60 and generally comprises a male threaded member comprising external threads. In the embodiment of FIGS. 11A-11C, the male extension 64 comprises a metal. For example, in various embodiments including that shown in FIGS. 11A-11C, a male extension 64 is provided that comprises a steel. In certain embodiments, the tool interface 66 and the male extension 64 comprise a unitary component comprising metal that is secured to the gripping portion 62 by an adhesive or other known connection means. In other embodiments, the male extension 64 comprise a different material and/or component relative to the tool interface 66. For example, it is contemplated that the gripping portion 62 and the tool interface 66 comprise plastic or elastomer elements, and the male extension comprises a metal or ferrous material. Metals for use in embodiments of the present disclosure include, but are not limited to, various steels and steel alloys, titanium, aluminum, and other metals.

Preferably, however the male extension 64 comprises a hardness that is sufficient to allow the cleat 60 to self-tap into various sole of footwear.

Figure 12A:
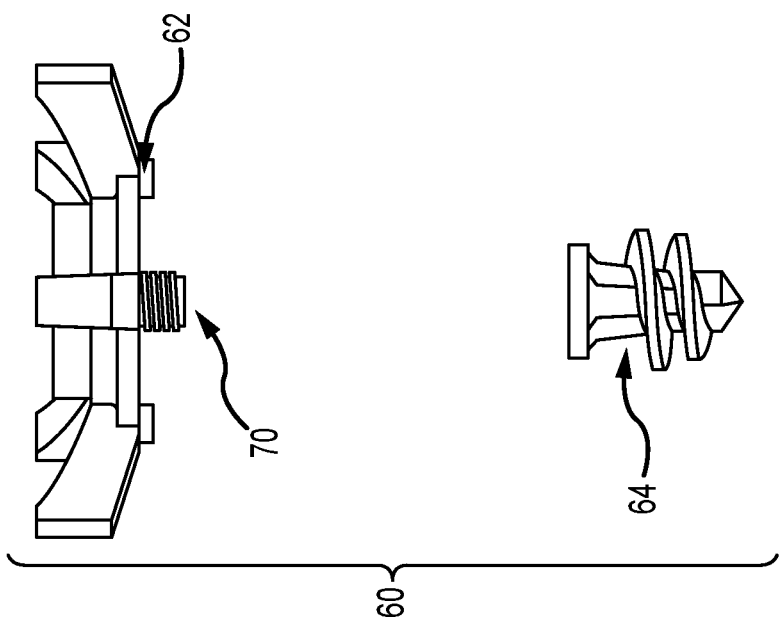
FIG. 12A is an exploded elevation view of a cleat according to one embodiment of the present disclosure.
Figure 12B:
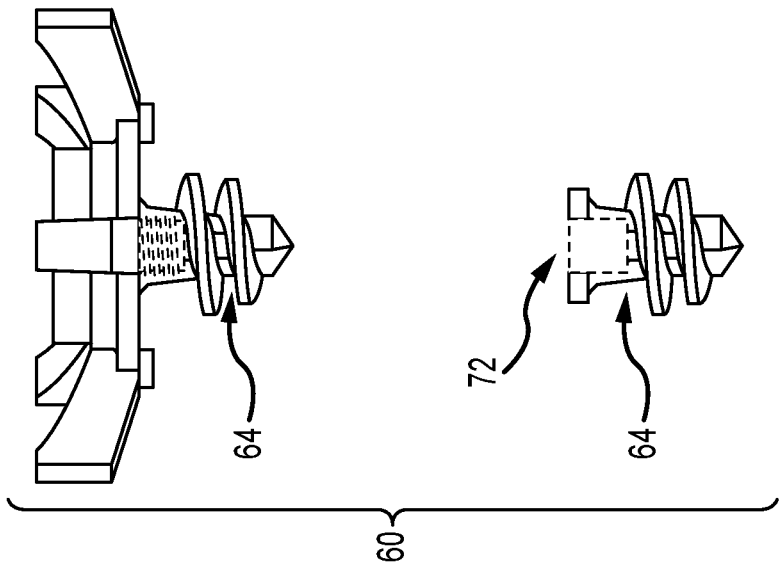
FIG. 12B is a partial cut-away view of the embodiment of FIG. 12A.

FIG. 12A is an elevation view of a cleat 60 according to another embodiment of the present disclosure. As shown, the cleat 60 comprises a gripping portion 62 comprising a first material and a first male threaded extension 64 comprising a second material. The gripping portion 62 comprises a second threaded extension 70 that is operable to communicate with the first male threaded extension 64. As shown in FIG. 12B, which is a partial cross-sectional view of the cleat 60 of FIG. 12A, the first male threaded extension 64 comprises a threaded female aperture 72 that receives the second threaded extension 70. In the embodiment of FIGS. 12A-12B, the threads of the first male threaded extension 64 and the second threaded extension 70 are both contemplated as comprising right-hand threads. In some embodiments, adhesive is further provided to secure the gripping portion and the first male threaded extension 64 and to enable extraction or removal of the cleat 60 without the gripping portion 62 being un-threaded from the first male threaded extension 64 and leaving the first male threaded extension 64 in a shoe sole. The embodiment of FIGS. 12A-12B is contemplated as comprising a metal or ferrous first male threaded extension 64 and a plastic or elastomer gripping portion 62.

Figure 13:
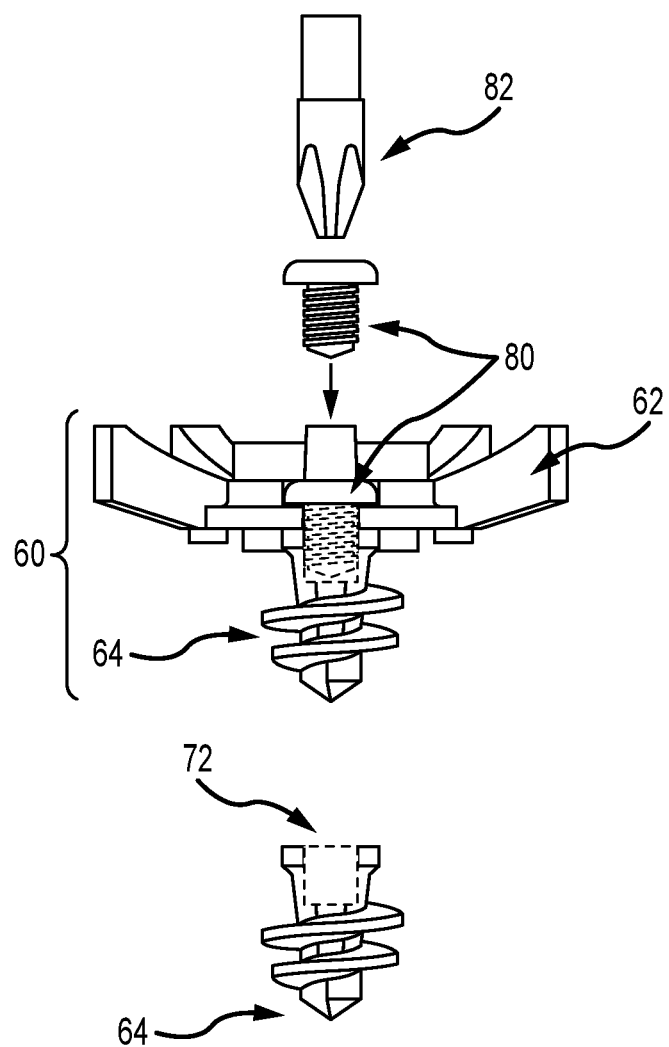
FIG. 13 is an elevation view of a cleat according to another embodiment of the present disclosure.

FIG. 13 is an elevation view of a cleat 60 according to another embodiment of the present disclosure. As shown, the cleat 60 comprises a gripping portion 62 comprising a first material and a first male threaded extension 64 comprising a second material. A fastener 80 is provided that is operable to communicate with the first male threaded extension 64 and the gripping portion 62. As shown in FIG. 13, which is a partial cross-sectional view of the cleat 60, the first male threaded extension 64 comprises a threaded female aperture 72 that receives the fastener 80 to secure the first male threaded extension 64 and the remainder of the cleat 60. In the embodiment of FIG. 13, the threads of the first male threaded extension 64 and the fastener 80 are both contemplated as comprising right-hand threads. In some embodiments, adhesive is further provided to secure the gripping portion, fastener 80 and the first male threaded extension 64 and to enable extraction or removal of the cleat 60 without the gripping portion 62 being un-threaded from the first male threaded extension 64 and leaving the first male threaded extension 64 in a shoe sole. The embodiment of FIG. 13 is contemplated as comprising a metal or ferrous first male threaded extension 64 and a plastic or elastomer gripping portion 62. The fastener 80 is contemplated as comprising various materials including, but not limited to stainless steel, and may be secured to the first male threaded extension 64 by a tool 82.

A shelf portion of the gripping portion 62 preferably contacts an underside of a flange or head of the fastener 80 to secure the components of the cleat 60 together in compression. As one of ordinary skill in the art will appreciate, the cleat 60 of the embodiment of FIG. 13 comprises a device that can be selectively inserted into a shoe sole (for example), and the gripping portion 62 comprises a modular element that can be removed and replaced. For example, the harder and preferably metallic first male threaded extension 64 can be allowed to remain in a shoe sole, and the plastic or elastomer gripping portion 62 with projections for contacting a ground surface (and may be prone to wear) can be removed without complete removal of all components of the cleat from a shoe.

Various features and components described with respect to certain embodiments are contemplated as being combined and provided with other embodiments, even if such combinations are not specifically disclosed or referenced. For example, the anti-reverse tabs 14 are contemplated as being provided with the embodiment of FIG. 13, even if such a specific combination of features is not shown.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity so as to not confuse the reader, and it is not intended that such claim term by limited, by implication or otherwise, to that single meaning.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention.

What is claimed is:

1. A system for modifying a preexisting article of footwear, comprising:
    a plurality of self-tapping cleats operable to be selectively secured to a preexisting article of footwear that is devoid of a preformed female aperture, each self-tapping cleat of the plurality of self-tapping cleats comprising:
        a first portion formed from a first material, the first portion comprising a male extension having an external thread and a distal point to facilitate insertion of the first portion into a sole of a preexisting article of footwear, the first portion further comprising a shelf, wherein the male extension extends in a first direction away from the shelf;
        a second portion formed from a second material, the second portion comprising a plurality of extensions that are operable to contact a ground surface, wherein each of the plurality of extensions extend in a second direction; and
        a tool interface formed within a substantially planar surface of the self-tapping cleat within a space defined between the plurality of extensions;
    a tool operable to apply a force to the self-tapping cleat via the tool interface along a longitudinal axis through the male extension during the insertion of the first portion into the sole of the preexisting article of footwear via the tool interface; and
    an adhesive operable to bond at least one of the first portion and the second portion of each of the plurality of self-tapping cleats onto or into a sole of the preexisting article of footwear to substantially prevent removal of the self-tapping cleats, wherein the first portion and the second portion are operable to be coated with the adhesive.

2. The system of claim 1, wherein the tool interface is recessed within the self-tapping cleat.

3. The system of claim 1, wherein the tool interface is accessible via an aperture within the second portion.

4. The system of claim 1, wherein the adhesive is applied to at least one surface of the male extension prior to the male extension being inserted into the sole of the preexisting article of footwear.

5. The system of claim 1, wherein the adhesive is applied to at least a portion of a surface of the shelf prior to the at least a portion of the surface of the shelf contacting the sole of the preexisting article of footwear when the first portion of the self-tapping cleat is inserted within the sole of the preexisting article of footwear.

6. The system of claim 1, further comprising:
packaging with information including installation procedures for the plurality of self-tapping cleats.

7. A system for modifying a preexisting article of footwear, comprising:
a self-tapping cleat operable to be selectively secured to a preexisting article of footwear that is devoid of a preformed female aperture, the self-tapping cleat comprising:
a first portion formed from a first material, the first portion comprising a self-tapping male extension having an external thread and a distal point to facilitate insertion of the first portion into a sole of the preexisting article of footwear, the first portion further comprising a shelf, wherein the male extension extends in a first direction away from the shelf;
a second portion formed from a second material, the second portion comprising a plurality of extensions that are operable to contact a ground surface, wherein each of the plurality of extensions extend in a second direction; and
a tool interface formed within at least the second portion and operable to receive a tool, the tool interface being aligned with the male extension along a longitudinal axis through the self-tapping cleat, the tool operable to engage at least the second portion of the self-tapping cleat to apply a force to the self-tapping cleat via the tool interface during the insertion of the first portion into the sole of the preexisting article of footwear.

8. The system of claim 7, wherein the tool interface is recessed within the shelf.

9. The system of claim 7, wherein the tool interface is an aperture within the second portion.

10. The system of claim 7, wherein at least a portion of a surface of the shelf is operable to contact the sole of the preexisting article of footwear following the insertion of the first portion of the self-tapping cleat into the sole of the preexisting article of footwear.

11. The system of claim 10, further comprising an adhesive that is applicable to the at least one surface of the self-tapping cleat prior to the insertion of the first portion of the self-tapping cleat into the sole of the preexisting article of footwear, and wherein the at least one surface of the self-tapping cleat is operable to be bonded to the preexisting article of footwear via the adhesive following the insertion of the first portion of the self-tapping cleat into the sole of the preexisting article of footwear.

12. The system of claim 11, wherein at least one surface of the male extension is coated with the adhesive prior to the male extension being inserted into the sole of the preexisting article of footwear.

13. The system of claim 11, wherein the at least a portion of a surface of the shelf is coated with the adhesive prior to the at least a portion of the surface of the shelf contacting the sole of the preexisting article of footwear when the first portion of the self-tapping cleat is inserted within the sole of the preexisting article of footwear.

14. The system of claim 13, wherein the second portion includes a surface which is operable to contact the sole of the preexisting article of footwear following the insertion of the first portion of the self-tapping cleat into the sole of the preexisting article of footwear.

15. The system of claim 13, wherein the second direction in which each of the plurality of extensions extend is offset by at least ninety degrees from the first direction.

16. The system of claim 13, wherein an interface between the first portion and the second portion comprises a contoured interface to increase surface area between the first portion and the second portion.

17. The system of claim 13, wherein the first material has a higher degree of hardness than the second material.

18. The system of claim 17, wherein the first material is a metal, and wherein the second material is a thermoplastic elastomer with a Shore durometer hardness of between approximately 80 and approximately 100.

19. The system of claim 17, wherein the first material is a glass-filled nylon, and wherein the second material is a thermoplastic elastomer with a Shore durometer hardness of between approximately 80 and approximately 100.

20. The system of claim 19, wherein the glass-filled nylon comprises at least about 20% glass by volume.

* * * * *